(12) United States Patent
Tajima

(10) Patent No.: US 9,283,886 B2
(45) Date of Patent: Mar. 15, 2016

(54) VEHICULAR HEADLAMP

(71) Applicant: KOITO MANUFACTURING CO., LTD., Minato-ku, Tokyo (JP)

(72) Inventor: Keiichi Tajima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/279,754

(22) Filed: May 16, 2014

(65) Prior Publication Data

US 2014/0340915 A1 Nov. 20, 2014

(30) Foreign Application Priority Data

May 17, 2013 (JP) ................................ 2013-105312

(51) Int. Cl.
*B60Q 1/068* (2006.01)
*B60Q 1/072* (2006.01)
*B60Q 1/076* (2006.01)

(52) U.S. Cl.
CPC .............. *B60Q 1/072* (2013.01); *B60Q 1/0683* (2013.01); *B60Q 1/076* (2013.01)

(58) Field of Classification Search
CPC ...... B60Q 1/0683; B60Q 1/068; B60Q 1/076; B60Q 1/122
USPC ......................................... 362/524, 560, 460
See application file for complete search history.

(56) References Cited

U.S. PATENT DOCUMENTS

| | | | |
|---|---|---|---|
| 4,954,933 A | 9/1990 | Wassen | |
| 5,906,431 A * | 5/1999 | Chianale et al. | 362/515 |
| 8,033,701 B2 * | 10/2011 | Watanabe et al. | 362/528 |
| 8,075,171 B2 * | 12/2011 | Yamamoto | 362/523 |
| 8,360,625 B2 * | 1/2013 | Shibata et al. | 362/523 |
| 2002/0018348 A1 * | 2/2002 | Miki et al. | 362/514 |
| 2008/0112179 A1 | 5/2008 | Tatara et al. | |
| 2008/0198614 A1 | 8/2008 | Tajima et al. | |
| 2011/0044063 A1 | 2/2011 | Yamamoto | |
| 2014/0321132 A1 * | 10/2014 | Shibata et al. | 362/460 |

FOREIGN PATENT DOCUMENTS

| | | |
|---|---|---|
| EP | 1270323 A1 | 1/2003 |
| FR | 2577013 A3 | 8/1986 |
| FR | 2981431 A1 | 4/2013 |
| JP | 2008-243605 A | 10/2008 |
| JP | 2008-300363 A | 12/2008 |

OTHER PUBLICATIONS

Communication dated Nov. 27, 2015 from the European Patent Office in counterpart application No. 14168600.6.

* cited by examiner

*Primary Examiner* — Anabel Ton
(74) *Attorney, Agent, or Firm* — Sughrue Mion, PLLC

(57) ABSTRACT

A vehicular headlamp includes: a lamp unit including a unit main body and a connecting portion; a leveling actuator that is connected to the connecting portion and that moves the lamp unit to adjust an irradiation direction of the emitted light; and an aiming mechanism that includes a pair of aiming shafts connected to the connecting portion and that moves the lamp unit to adjust an irradiation direction of the emitted light. The connecting portion has a leveling operation portion to which the leveling actuator is connected and a pair of aiming operation portions to which the respective the aiming shafts are connected. The aiming operation portions are arranged spaced from each other in a lateral direction of the vehicular headlamp. The leveling operation portion is arranged between the aiming operation portions, on an opposite side of the unit main body from the aiming shafts.

9 Claims, 8 Drawing Sheets

VEHICULAR HEADLAMP

INCORPORATION BY REFERENCE

The disclosure of Japanese Patent Application No. 2013-105312 filed on May 17, 2013 including the specification, drawings and abstract is incorporated herein by reference in its entirety.

BACKGROUND OF THE INVENTION

1. Field of the Invention

The present invention relates to a vehicular headlamp that is capable of adjusting an optical axis with use of an aiming mechanism and a leveling actuator.

2. Description of Related Art

A vehicular headlamp include the type in which a lamp unit including a lamp source is accommodated inside a lamp outer case that is constituted by a cover and a lamp housing, the lamp unit is rotatably (tiltably) supported by an aiming mechanism via a supporting member such as a bracket, and the lamp unit is allowed to rotate by a driving force of a levelling actuator (See, for example, Japanese Patent Application Publication No. 2008-300363 (JP 2008-300363 A), for example).

In such a vehicular headlamp, the aiming mechanism rotates the lamp unit to move in a vertical or lateral direction and so-called "aiming adjustment" for initial adjustment of an optical axis offset is thereby performed, while the leveling actuator rotates the lamp unit to move in the vertical direction and so-called "leveling adjustment" for adjusting an optical axis offset which varies depending on a load on a vehicle In the vehicular headlamp disclosed in JP 2008-300363 A, a pair of laterally spaced aiming shafts are provided at an upper end portion of a bracket that supports the lamp unit. In addition, an output shaft of the leveling actuator is connected to the bracket at a position directly under a portion to which one of the aiming shafts is connected. Thus, the connected positions of the aiming shafts to the bracket and the connected position of the leveling actuator forms an L-shaped connecting state.

However, in the vehicular headlamp disclosed in JP 2008-300363 A, the L-shaped connecting state formed by the connected positions of the aiming shafts to the bracket and the connected position of the leveling actuator may reduce the balance between the connected positions relative to the lamp unit. Accordingly, it is difficult to secure sufficient strength of the vehicular headlamp against vibrations.

In addition, the output shaft of the leveling actuator is arranged at a position offset to the right or the left from the central axis of the lamp unit and thus the leveling actuator tends to be arranged in a lopsided state. As a result, it is difficult to efficiently utilize the internal space of a lamp outer case and may prevent size reduction of the vehicular headlamp.

SUMMARY OF THE INVENTION

The present invention provides a vehicular headlamp that achieves an enhanced strength against vibrations and a reduced size.

An aspect of the present invention relates to a vehicular headlamp including: a lamp unit that includes a unit main body including a light source and a connecting portion arranged at least partially at an outer circumferential side of the unit main body; a leveling actuator that is connected to the connecting portion and that moves the lamp unit to adjust an irradiation direction of light emitted from the light source; and an aiming mechanism that includes a pair of aiming shafts connected to the connecting portion and that moves, through an operation of the aiming shafts, the lamp unit to adjust an irradiation direction of light emitted from the light source. The connecting portion has a leveling operation portion to which the leveling actuator is connected and a pair of aiming operation portions to which the respective the aiming shafts are connected. The pair of the aiming operation portions are arranged spaced from each other in a lateral direction of the vehicular headlamp. The leveling operation portion is arranged between the pair of the aiming operation portions, on an opposite side of the unit main body from the pair of the aiming shafts.

According to the present invention, it is possible to make the positions of the aiming operation portions and the position of the leveling operation portion relative to the lamp unit in good balance, and therefore sufficient strength against vibrations is ensured. In addition, since the position of the leveling actuator is not in lopsided state in either side in the lateral direction, it is possible to efficiently utilize a space of a lamp chamber, thereby reducing the size of the vehicular headlamp.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, embodiments of a vehicular headlamp for carrying out the present invention will be described with reference to the attached drawings.

Vehicular headlamps 1 are arranged and fixed on laterally opposite end portions of a front end portion of a vehicle body.

Figure 1:
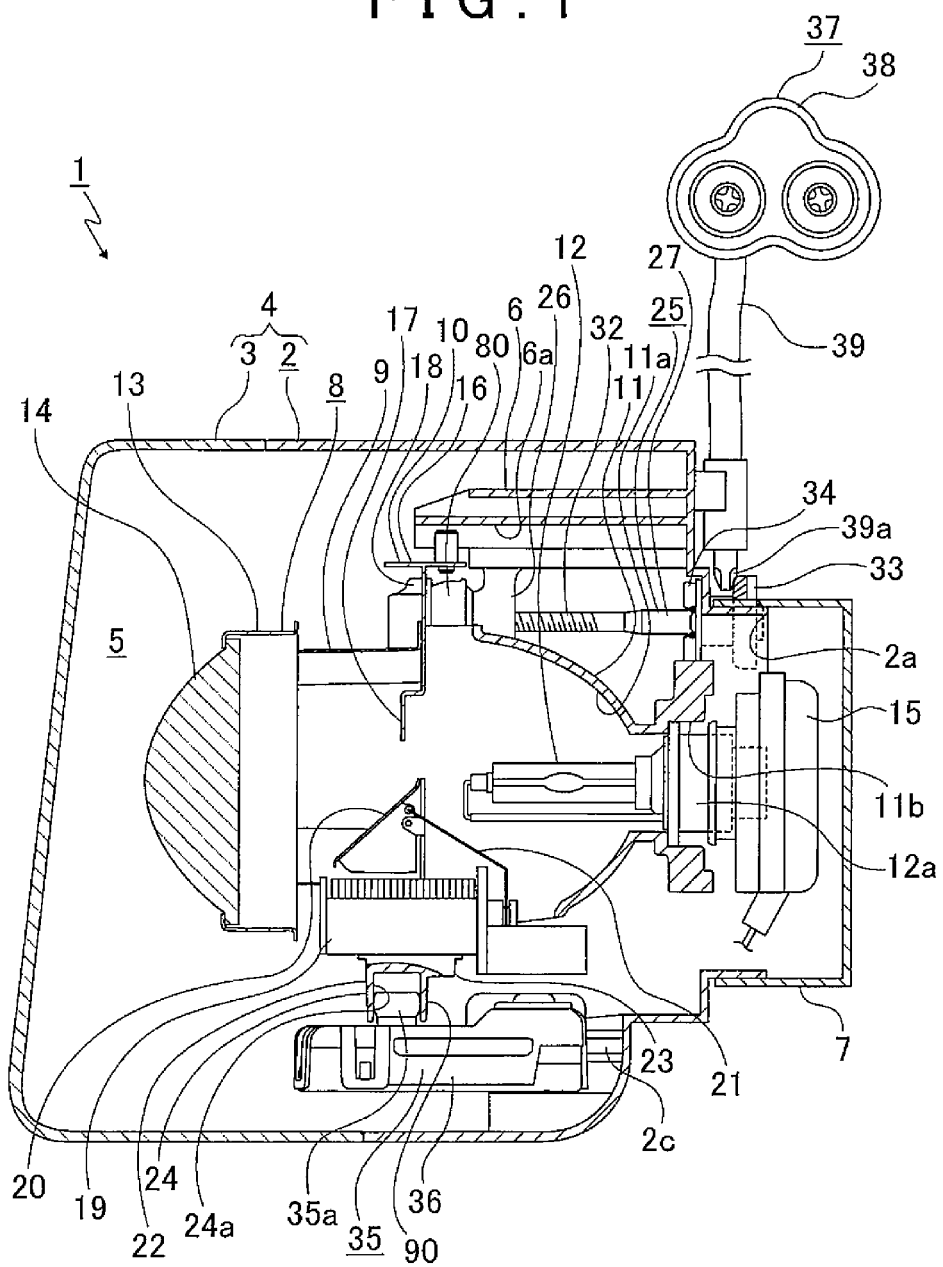
FIG. 1 is a schematically illustrates a vertical cross-sectional view of a vehicular headlamp and shows embodiments of the present invention together with FIG. 2 to FIG. 13.

As illustrated in FIG. 1, the vehicular headlamp 1 includes a lamp housing 2 that opens in a frontward direction and a cover 3 that closes the opening of the lamp housing 2. The lamp housing 2 and the cover 3 constitute a lamp outer case 4 whose interior space is used as a lamp chamber 5.

Figure 2:
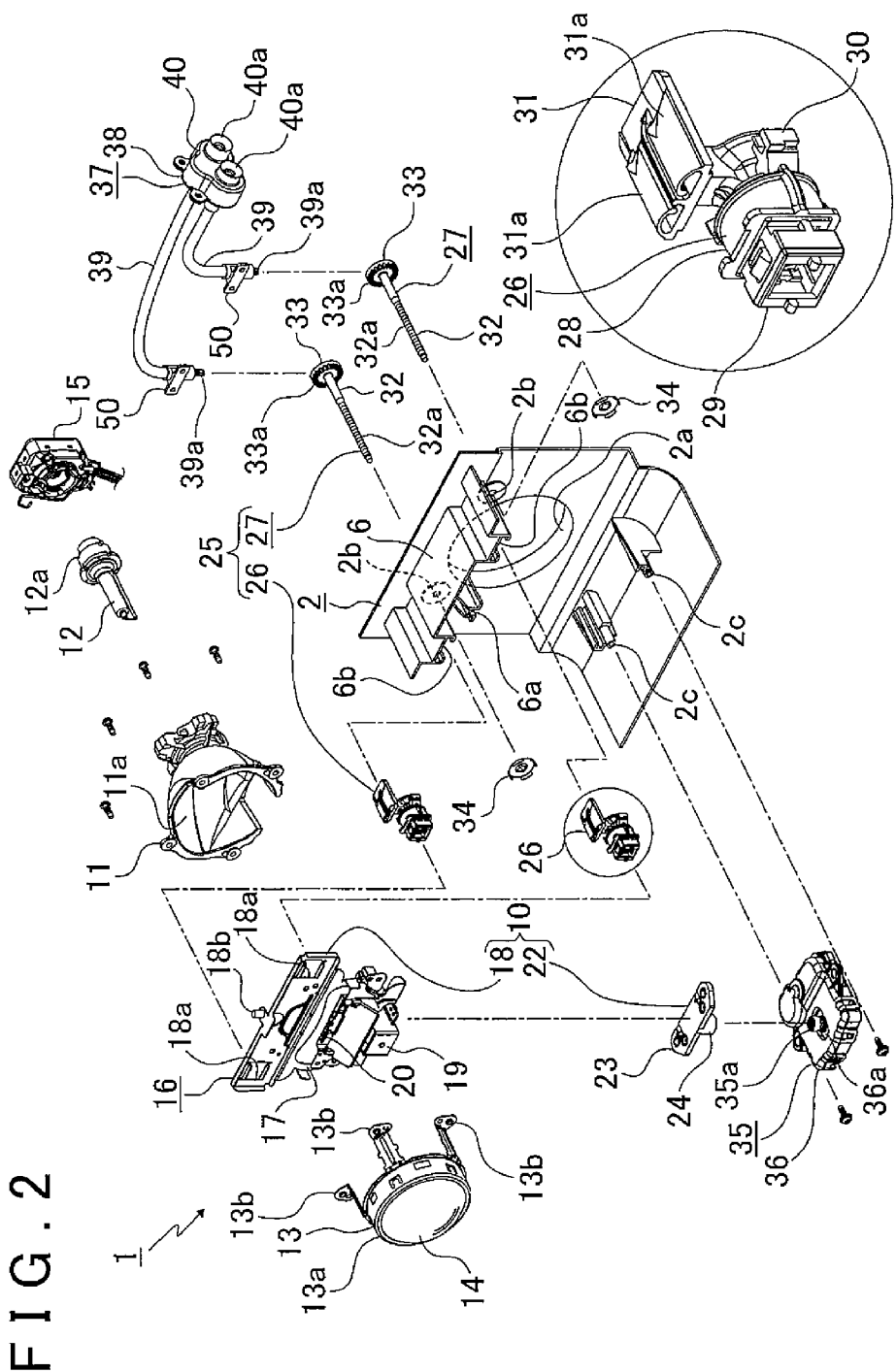
FIG. 2 is an exploded view of a lamp unit and its surrounding structures.
Figure 3:
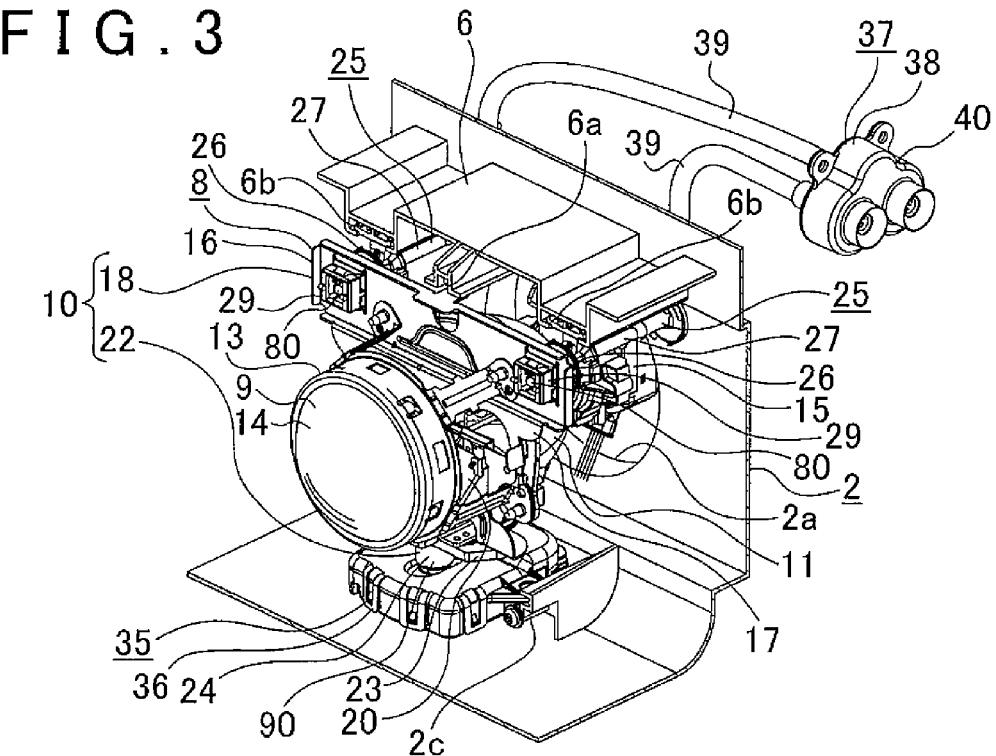
FIG. 3 is a perspective view of the lamp unit and its surrounding structures.

A mounting open portion 2a that penetrates in a front-rearward direction is formed at a rear end portion of the lamp housing 2 (See FIGS. 1 to 3). A support protrusion 6 that extends in the frontward direction is provided at an inner surface of the rear end portion of the lamp housing 2. The support protrusion 6 is arranged at a higher position than the mounting open portion 2a. A regulation groove 6a that opens in a downward direction and extends in a front-rearward direction is formed in the support protrusion 6. Also, sliding grooves 6b and 6b that open in a downward direction is formed in the support protrusion 6. The sliding grooves 6b and 6b are spaced from each other in the lateral direction and positioned at right and left sides of the regulation groove 6a, respectively. Laterally both sides of each sliding groove 6b opens inwardly and the portion other than the laterally both sides of each sliding groove 6b opens in the downward direction.

Shaft insertion holes 2b and 2b are formed at the rear end portion of the lamp housing 2, between the mounting open portion 2a and the support protrusion 6. The shaft insertion holes 2b and 2b are spaced from each other in the lateral direction.

Stationary protrusions 2c and 2c which are projected in the frontward direction are provided at the inner surface of the rear end portion of the lamp housing 2. The stationary protrusions 2c and 2c are arranged in a spaced relationship in the lateral direction and are positioned at a lower position than the mounting open portion 2a.

A back cover 7 that covers the mounting open portion 2a is attached to the rear end portion of the lamp housing 2.

A lamp unit 8 is arranged in the lamp chamber 5 (See FIG. 1). The lamp unit 8 includes a unit main body 9 and a connecting portion 10 (See FIGS. 1 to 5).

The unit main body 9 includes a reflector 11 whose inner surface reflects light, a light source 12 supported at a rear end portion of the reflector 11, a lens holder 13 placed in front of the reflector 11, a projection lens 14 supported at a front end portion of the lens holder 13.

The reflector 11 has a bowl-shape that opens in the frontward direction, and the inner surface of the reflector is formed as a reflection surface 11a. A lamp source mounting hole 11b is formed at the rear end portion of the reflector 11.

As the light source 12, a discharge lamp, for example, is available. A rear end portion of the light source 12 is formed as a base portion 12a. The light source 12 is attached to the reflector 11 with the base portion 12a inserted into the lamp source mounting hole 11b.

A driving circuit portion 15 is connected to the rear of the base portion 12a. The driving circuit portion 15 serves as a driving portion that turns on and off the light source 12. The driving circuit portion 15 is connected to a power source circuit (not shown).

The lens holder 13 is made up of a lens holding portion 13a having a substantially annular shape and a plurality of connecting legs 13b, 13b, 13b, and so on that protrude from the lens holding portion 13a in the rearward direction. The plurality of the connecting legs 13b, 13b, 13b, and so on are spaced from each other in a circumferential direction the lens holding portion 13a.

The projection lens 14 is formed in a semispherical shape protruding in the frontward direction. A rear end portion of the projection lens 14 is attached to the lens holding portion 13a and the projection lens 14 is thereby supported by the lens holder 13.

A connecting body 16 is arranged between the reflector 11 and the lens holder 13. The connecting body 16 is formed in a substantial flat plate having surfaces that face the front direction and the rearward direction. An annular-shaped stationary shade 17 is integrally formed with a connecting surface portion 18 (as a single member) to form the connecting body 16. The stationary shade 17 blocks a part of light emitted from the light source 12, and the connecting surface portion 18 is provided in continuous with an outer periphery of the stationary shade 17 (See FIGS. 1 and 2).

A rear end portion of each connecting leg 13b of the lens holder 13 and a front end portion of the reflector 11 is connected to the connecting body 16 by, for example, a screw. Thus, the lens holder 13 is arranged so as to cover the front side of the stationary shade 17, while the reflector 11 is arranged so as to cover the rear side of the stationary shade 17.

Connecting holes 18a and 18a are formed at an upper end portion of the connecting surface portion 18 (See FIG. 2), being spaced form each other in the lateral direction. The connecting hole 18a is formed into a rectangular shape and a vertical width of the connecting hole 18a is slightly longer than a lateral width of the connecting hole 18a. A regulated portion 18b having a columnar shape is provided at a lateral center portion of the connecting surface portion 18. The regulated portion 18b protrudes in the upward direction.

A solenoid 19 and a movable shade 20 driven by a driving force generated by the solenoid 19 is arranged on the connecting body 16 (See FIGS. 1 and 2). The solenoid 19 includes a driving shaft 19a to be moved in an axial direction by electromagnetic force. The movable shade 20 is connected, via a connecting wire 21, to the driving shaft 19a. The movable shade 20 rotates around a shaft that extends in the lateral direction, as a result of the axial movement of the driving shaft 19a.

The solenoid 19 and the movable shade 20 are arranged inside the stationary shade 17. Rotation of the movable shade 20 varies a blocked amount of light that is emitted from the light source 12, thereby, for example, switching between high-beam light distribution patter and low-beam light distribution pattern.

A connecting member 22 is attached to the lower surface of the connecting body 16. The connecting member 22 is made up of a mounted portion 23 and a connecting protrusion 24. The mounted portion 23 is formed in a laterally long flat plate having surfaces that face the upward direction and the downward directions, and the connecting protrusion 24 protrudes downwardly from a lateral center portion of the mounted portion 23. The connecting protrusion 24 opens downwardly and its inner space is used as a connecting concave portion 24a.

The stationary shade 17 of the connecting body 16 configured as described above constitutes, together with the solenoid 19 and the movable shade 20, part of the unit main body 9, and the connecting surface portion 18 constitutes, together with the connecting member 22, the connecting portion 10 connected to a aiming mechanism and a leveling actuator both of which will be detailed later.

The lamp unit 8 configured as describe above is rotatably (tiltably) supported by the aiming mechanism 25 and thus by the lamp housing 2 (See FIGS. 1 to 5). The aiming mechanism 25 includes fulcrum bodies 26 and 26, and aiming shafts 27 and 27.

The fulcrum body 26 is made up of a rotation fulcrum portion 28, an insertion connecting portion 29, a support portion 30, and a sliding portion 31. The rotation fulcrum portion 28 has a spherical outer profile is of a spherical shape, the insertion connecting portion 29 is formed in continuous with a front side of the rotation fulcrum portion 28, the support portion 30 is formed in continuous with a rear side of the rotation fulcrum portion 28, and the sliding portion 31 is formed in continuous with an upper side of the support portion 30 (See FIG. 2).

The rotation fulcrum portion 28 is movable, together with the insertion connecting portion 29, relative to the other members, at least, in the vertical direction. The rotation fulcrum portion 28 is used as a fulcrum of rotation upon leveling adjustment using the leveling actuator.

In the insertion connecting portion 29, a spiral groove (not shown) is formed at its inner surface. An outer profile of the insertion connecting portion 29 is formed into a rectangular shape, and the insertion connecting portion 29 is inserted into the connecting hole 18a formed in the connecting surface portion 18 of the connecting body 16. The fulcrum body 26 and the he connecting body 16 are connected by the insertion of the insertion connecting portion 29 into the connecting hole 18a, and thus the fulcrum body 26 is not allowed to move relative to the connecting body 16 in the front-rearward direction. In addition, in a state where the insertion connecting portion 29 is inserted into the connecting hole 18a, space is defined between the connecting hole 18a and the insertion connecting portion 29 in the lateral direction. Thereby, the fulcrum body 26 is capable of moving relative to the connecting body 16 in the lateral direction.

The sliding portion 31 includes leaf spring portions 31a and 31a that is provided at an upper surface of the sliding portion 31 and that are deformable in the vertical direction. The sliding portion 31 is inserted into the sliding groove 6b, formed in the support protrusion 6 of the lamp housing 2, from the front side. The sliding portion 31 is supported by the support protrusion 6 such that the sliding portion 31 is slidable in the front-rearward direction (See FIG. 4). In a state where the sliding portion 31 is inserted into the sliding groove 6b, the leaf spring portions 31a and 31a of the sliding portion 31 contact with an upper side surface portion of the sliding portion 31, while both lateral side surfaces in a lower surface of the sliding portion 31 is pressed against a lower side surface portion of the sliding portion 31, thereby preventing a backlash relative to the support protrusion 6 in the vertical direction.

The aiming shaft 27 is made up of a shaft portion 32 and an operation portion 33 connected to the rear end portion of the shaft portion 32 (See FIGS. 1 and 2). An axial direction of the shaft portion 32 extends in the front-rearward direction, and a portion of the shaft portion 32 except for the its end portion is formed as a thread portion 32a. The operation portion 33 is formed in an annular shape extending outwardly from the rear end portion of the shaft portion 32, and has a gear portion 33a formed on a an outer periphery of a front surface of the operation portion 33.

The shaft portion 32 of the aiming shaft 27 is inserted, from the rear side, into the shaft insertion hole 2b formed in the lamp housing 2, passes through a rotation stop washer 34, and then the thread portion 32a of the aiming shaft 27 is brought into thread engagement with the spiral groove formed in the insertion connecting portion 29 of the fulcrum body 26. Thus, the connecting body 16 of the lamp unit 8 is connected, via the fulcrum bodies 26 and 26, to the respective aiming shafts 27 and 27. Upon rotations of the respective aiming shafts 27 and 27, the spiral grooves which are in thread engagement with the respective thread portions 32a and 32a are brought into movements depending on the rotational directions of the respective aiming shafts 27, thereby moving the fulcrum bodies 26 and 26, together with the lamp unit 8, in the front-rearward direction.

Figure 4:
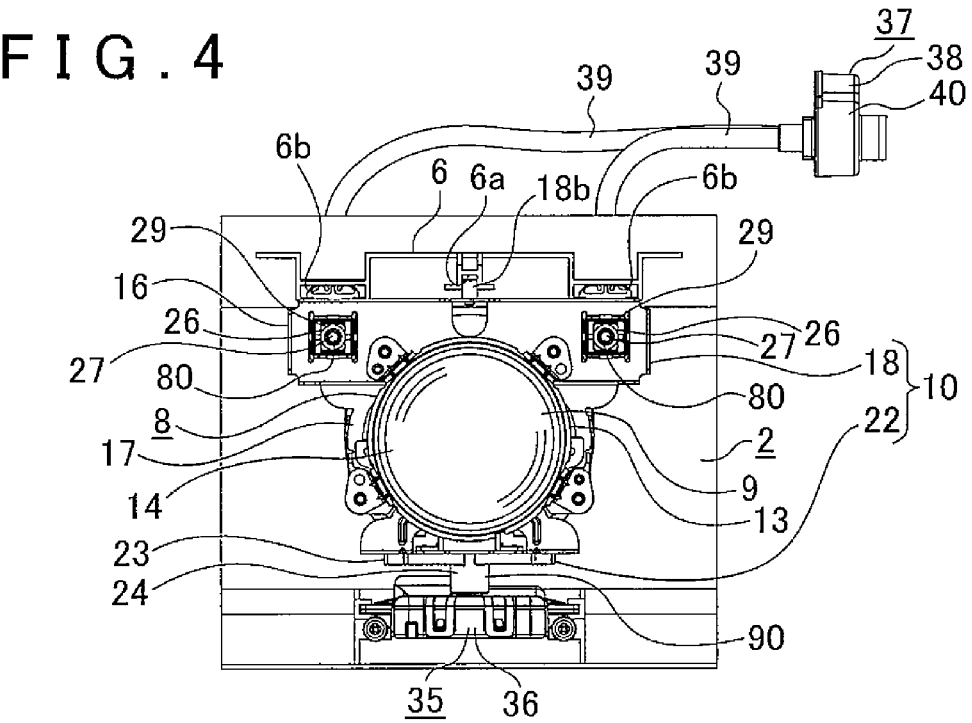
FIG. 4 is a front view of the lamp unit and its surrounding structures.

In a state where the aiming shafts 27 and 27 are connected to the respective fulcrum bodies 26 and 26 connected to the connecting body 16 and the sliding portion 31 and 31 is supported by the support protrusion 6, the regulated portion 18b of the connecting body 16 is inserted, from the front side, into the regulation groove 6a formed at the support protrusion 6 of the lamp housing 2 (See FIG. 4). Thus, the lamp unit 8 is allowed to move in the front-rearward direction, but is restricted to move in the lateral direction by inserting the fact that the regulated portion 18b into the regulation groove 6a.

Regions of the connecting portion 10 (connecting surface portion 18) to which the pair of the aiming shafts 27 and 27 are connected are formed as aiming operation portions 80 and 80.

A leveling actuator 35 is arranged under the lamp unit 8. The leveling actuator 35 is fixed to the stationary protrusions 2c and 2c of the lamp housing 2 by screwing or the like.

The leveling actuator 35 includes a case body 36 and a driving mechanism (not shown) arranged inside the case body 36.

An insertion hole 36a is formed at an upper surface portion of the case body 36 such that the insertion hole 36a penetrates through the upper surface portion of the case body 36 in the vertical direction. The insertion hole 36a has a shape extending in the front-rearward direction.

The leveling actuator 35 includes an output shaft 35a that is driven by the driving mechanism to move in the front-rearward direction. The output shaft 35a protrudes, through the insertion hole 36a, in the upward direction.

The output shaft 35a of the leveling actuator 35 is inserted into the connecting concave portion 24a of the connecting member 22, thereby connecting the leveling actuator 35 to the connecting protrusion 24. In a state where the output shaft 35a is connected to the connecting protrusion 24, the lamp unit 8 is allowed to rotate about the output shaft 35a to move in both substantially lateral and vertical directions. When the output shaft 35a is moved in the front-rearward direction, the lamp unit 8 rotate about the rotation fulcrum portions 28 and 28 of the respective fulcrum bodies 26 and 26 to move in the substantially vertical direction depending on the moving direction of the output shaft 35a.

A region of the connecting member 22 (connecting portion 10) to which the output shaft 35a is connected is formed as a leveling operation portion 90. The leveling operation portion 90 is arranged between the pair of the aiming operation portions 80 and 80, on the opposite side of the unit main body 9 from the aiming shafts 27 and 27 (on a side of the unit main body 9 opposite to a side where the aiming shafts 27 and 27 are arranged) (See FIG. 4). In this case, it is preferable that leveling operation portion 90 is arranged at a position immediately under an intermediate position between the pair of the aiming operation portions 80 and 80 in the lateral direction. In addition, it is preferable that the regulated portion 18b provided on the connecting surface portion 18 of the connecting body 16 is positioned immediately above the leveling operation portion 90.

The aiming shafts 27 and 27 are allowed to rotate by a gear unit 37 (See FIGS. 1 to 5). The gear unit 37 includes a gear case 38, a plurality of gears accommodated in the gear case 38, a gear switching mechanism, and rotation wires 39 and 39 to which gear rotational forces are transmitted.

Figure 6:
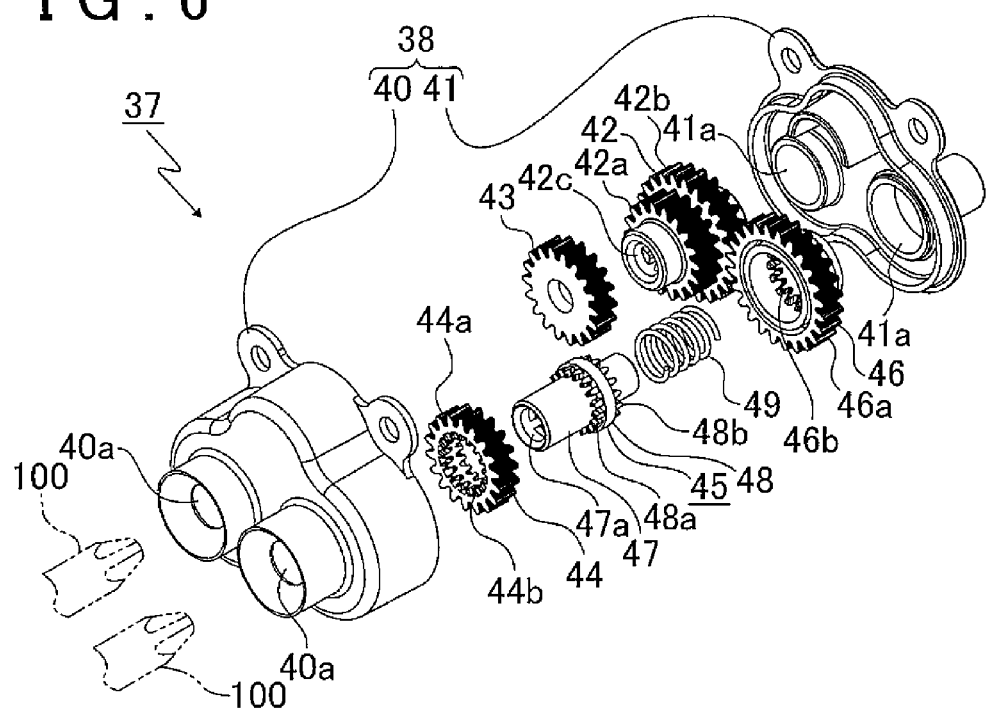
FIG. 6 is a perspective view of the gear unit with a portion thereof omitted.
Figure 7:
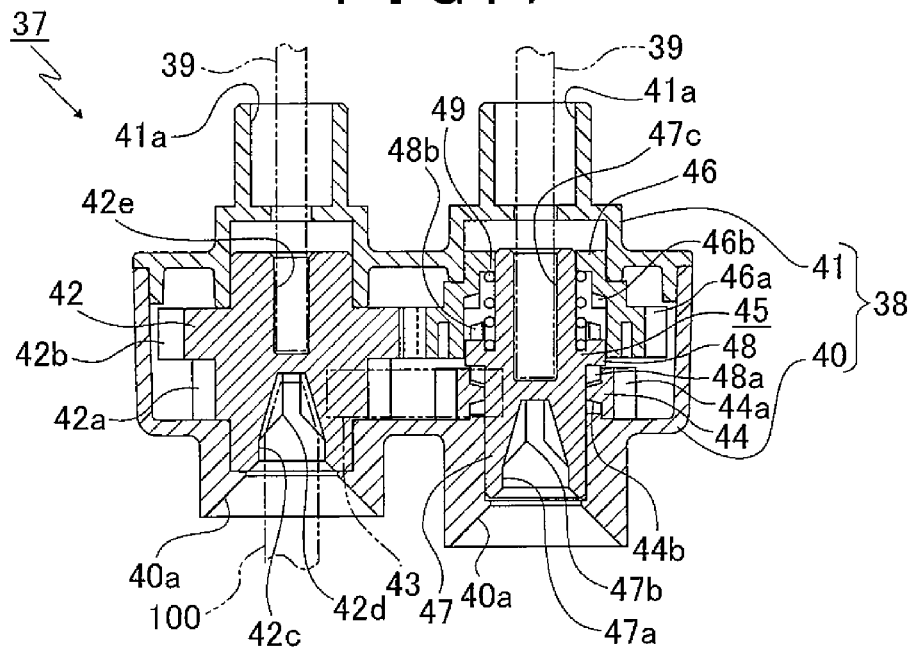
FIG. 7 is an enlarged view of the gear unit to which an operation is made in a first switching mode.
Figure 8:
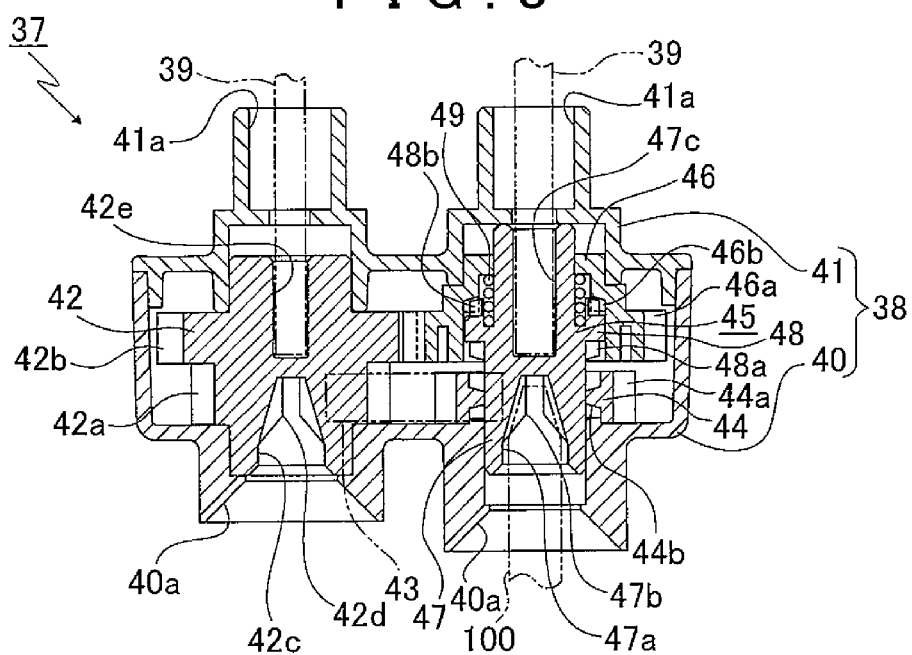
FIG. 8 is an enlarged view of the gear unit to which an operation is made in a second switching mode.

The gear case 38 is configured by a combination of a storing case portion 40 having at its one end an opening and a lid portion 41 that closes the opening of the storing case portion 40 (See FIGS. 6 to 8). Jig insertion holes 40a and 40a are formed in the storing case portion 40. Wire passing holes 41a and 41a are formed in the lid portion 41.

A two-stage driving gear 42, a first connecting gear 43, an operation gear 44, a driving gear 45, and a second connecting gear 46 are accommodated within the gear case 38.

The two-stage driving gear 42 has a small-diameter gear portion 42a and a large-diameter gear portion 42b. A jig insertion hole 42c that opens toward one side of the axial direction is formed in the two-stage driving gear 42. A jig engagement portion 42d to be engaged with a jig 100, such as a screw driver, is formed at a bottom portion of the jig insertion hole 42c. A connecting hole 42e that opens in the other side in the axial direction is formed in the two-stage driving gear 42.

The first connecting gear 43, which is a spur gear, meshes with the small-diameter gear portion 42a of the two-stage driving gear 42.

An outer gear portion 44a is formed at an outer periphery of the operation gear 44 and an inner gear portion 44b is formed at an inner periphery of the operation gear 44. The outer gear portion 44a od the operation gear 44 meshes with the first connecting gear 43.

The driving gear 45 is made up of a shaft portion 47 and a gear forming portion 48 extending outward from an axial directional center portion of the shaft portion 47. A jig insertion hole 47a that opens toward one side of the axial direction is formed in the shaft portion 47, and a jig engagement portion 47b to be engaged with the jig 100 is formed at an bottom portion of the jig insertion hole 47a formed in the driving gear 45. A connecting hole 47c that opens toward the other side of the axial direction is formed in the driving gear 45. In the gear forming portion 48, a first switching gear portion 48a is formed at an one side surface in the axial direction, and second switching gear portion 48b is formed at the other side surface.

An urging spring 49 is supported by a portion of the shaft portion 47 on a side of the connecting hole 47c in the driving gear 45.

In the second connecting gear 46, an outer gear portion 46a is formed at an outer periphery and an inner gear portion 46b is formed at an inner periphery. The outer gear portion 46a of the second connecting gear 46 meshes with the large-diameter gear portion 42b of the two-stage driving gear 42.

In the driving gear 45, with the urging spring 49 supported, a portion of the shaft portion 47 on a side of the connecting hole 47c and a substantially half of the gear forming portion 48 are rotatably inserted inside the operation gear 44, and a portion of the shaft portion 47 on a side of the jig insertion hole 47a and a substantially half of the gear forming portion 48 are rotatably inserted inside the second connecting gear 46 as to be rotatable.

The driving gear 45 is urged by the urging spring 49 in a direction of the operation gear 44 and the first switching gear portion 48a meshes with the inner gear portion 44b of the operation gear 44.

The two-stage driving gear 42 is arranged on an axis connecting one of the jig insertion holes 40a and one of the wire insertion holes 41a, while the operation gear 44, the driving gear 45 and the second connecting gear 46 is arranged on an axis connecting the other jig insertion hole 40a and the other wire insertion hole 41a. The first connecting gear 43 is arranged with meshed with the small-diameter gear portion 42a of the two-stage driving gear 42 and with the outer gear portion 46a of the second connecting gear 46.

The rotation wire 39 has at its one end portion a gear portion 39a. The other end portions of the rotation wires 39 and 39 are inserted into a connecting hole 42e and a connecting hole 47c and thus the rotation wires 39 and 39 are connected to the two-stage driving gear 42 and the driving gear 45, respectively. Accordingly, the rotation wires 39 and 39 rotate together with rotations of the respective two-stage driving gear 42 and the driving gear 45.

Figure 5:
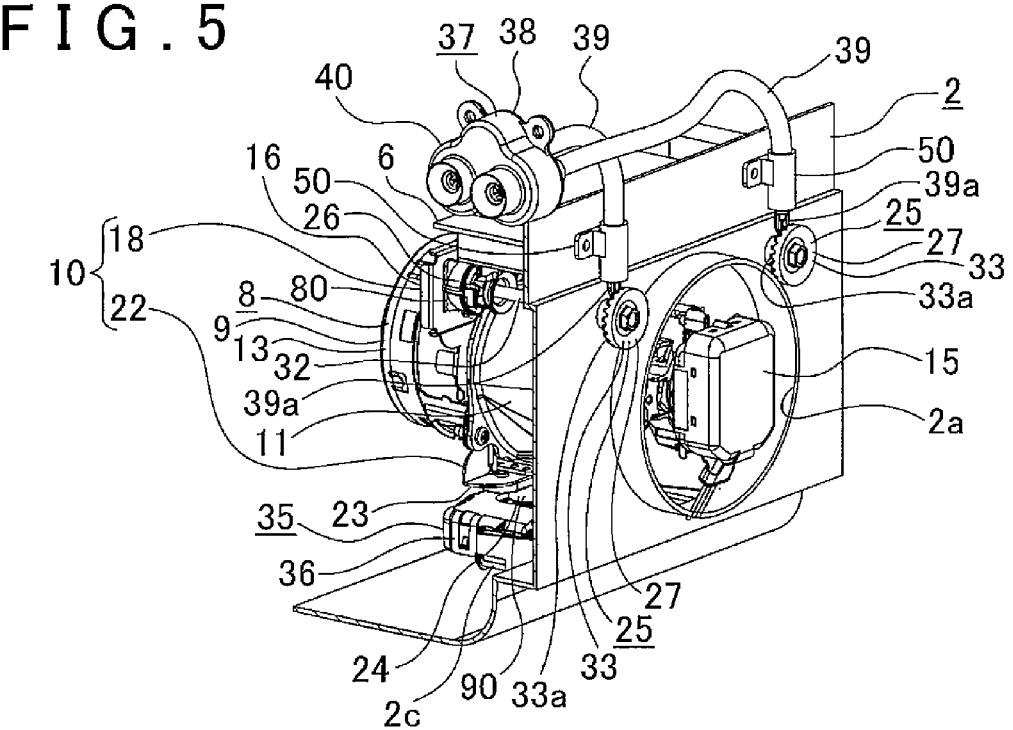
FIG. 5 is a perspective view of the lamp unit and its surrounding structures viewed from the side opposite to the side from which the lamp unit and its surrounding structure is viewed in FIG. 3.

The rotation wires 39 and 39 are connected, via respective metal fixtures 50 and 50, to a rear surface of the lamp housing 2, and the gear portions 39a and 39a mesh with the gear portions 33a and 33a that are formed in the operation portions of the aiming shafts 27 and 27, respectively (See FIG. 5). Thus, when the rotation wires 39 and 39 rotates together with the respective rotation of the two-stage driving gear 42 and rotation of the driving gear 45, the respective aiming shafts 27 and 27 are caused to rotate, due to the resulting rotations of the respective gear portions 33a and 33a, in directions depend on the respective rotation direction of the two-stage driving gear 42 and rotation direction of the driving gear 45.

In the gear unit 37 configured as described above, as shown in FIG. 7, the jig 100 is inserted, via the one of the jig insertion holes 40a and 40a of the gear case 38, into the jig insertion hole 42c of the two-stage driving gear 42 and rotates after the jig 100 is engaged with the jig engagement portion 42d, the two-stage driving gear 42 is caused to rotate. At this time, the driving gear 45 is urged, by the urging spring 49, to move toward the operation gear 44, which allows the first switching gear portion 48a to mesh with the inner gear portion 44b of the operation gear 44. As a result, the first switching mode is set.

Thus, when the two-stage driving gear 42 is caused to rotate, the resulting rotational force is transmitted to the first connecting gear 43, the operation gear 44, and the driving gear 45 in such an order, and then the driving gear 45 rotates in the same direction as the rotational direction of the two-stage driving gear 42.

At this time, the operation gear 44 that meshes with the large-diameter gear portion 42b rotates together with the rotation of the two-stage driving gear 42. The driving gear 45 rotate independently of rotation of the operation gear 44.

When the two-stage driving gear 42 and the driving gear 45 rotates in the same direction, the resulting rotations of the respective rotation wires 39 and 39 in the same direction cause the aiming shafts 27 and 27 to rotate in the same direction. Then, the lamp unit 8 rotates about the output shaft 35a of the leveling actuator 35 to move in the substantially vertical direction, thereby performing the vertical aiming adjustment. At this time, the sliding portions 31 and 31 of the fulcrum bodies 26 and 26 slide in the sliding grooves 6b and 6b, respectively, and the regulated portion 18b formed on the connecting body 16 is guided by the regulation groove 6a of the support protrusion, and as a result, the lamp unit 8 moves in the substantially vertical direction while being.

In addition, in the gear unit 37 as shown in FIG. 8, when the jig 100 is inserted, via the other jig insertion hole 40a of the gear case 38, into the jig insertion hole 47a of the driving gear 45, and the driving gear 45 is urged by the jig 100 toward the second connecting gear 46 after the jig 100 engages with the jig engagement portion 47b, the driving gear 45 move toward the second connecting gear 46 against the urging force of the urging spring 49. Upon completion of such a movement of the driving gear 45 toward the second connecting gear 46, the mesh of the driving gear 45 with the inner gear portion 44b of the first switching gear portion 48a is cancelled, while the second switching gear portion 48b meshes with the inner gear portion 46b of the second connecting gear 46. As a result, the second switching mode is set.

With the second switching mode set, when the driving gear 45 rotates due to the rotation of the jig 100, the resulting rotational force is transmitted to the two-stage driving gear 42 to cause the two-stage driving gear 42 to rotate in the opposite direction to the rotation direction of the driving gear 45.

At this time, though the first connecting gear 43 and the second connecting gear 46 rotate together with the rotation of the two-stage driving gear 42, the driving gear 45 rotates independently of the operation gear 44 since the driving gear 45 does not mesh with the operation gear 44.

When the two-stage driving gear 42 and the driving gear 45 rotates in opposite directions, the respective rotation wires 39 and 39 rotates in opposite directions, which causes the respective aiming shafts 27 and 27 to rotate in opposite directions. Thereby, lamp unit 8 rotates about the output shaft 35a of the leveling actuator 35 to move in the substantially lateral direction, thereby performing the lateral aiming adjustment.

At this time, the regulated portion 18b provided on the connecting body 16 is regulated to move in the lateral direction by the regulation groove 6a of the support protrusion 6. Accordingly, the lateral aiming adjustment is performed by the rotation of the lamp unit 8 without being tilted in the lateral direction.

Thus, providing the regulated portion 18b on the connecting body 16 makes it possible to restrict the inclination of the lamp unit 8 upon performing the aiming adjustment.

In addition, the regulated portion 18b is arranged at the position corresponding to the intermediate position between the pair of the aiming operation portions 80 and 80, immediately above the leveling operation portion 90. Accordingly, the regulated portion 18b is less likely to receive a load in the lateral direction due to, for example, own weight of the lamp unit 8, thereby making it possible to stably perform the aiming adjustment of the lamp unit 8.

When the lateral aiming adjustment is performed, the direction of the connecting body 16 varies relative to the insertion connecting portions 29 and 29 of the respective fulcrum bodies 26 and 26, but as described above, the space are defined between the insertion connecting portions 29 and 29 of the respective fulcrum bodies 26 and 26 and the connecting holes 18a and 18a in the lateral direction, which allows the connecting surface portion 18 to displace from the insertion connecting portions 29 and 29, whereby the lamp unit 8 is not applied with unnecessary loads from the fulcrum bodies 26 and 26.

As described above, using the gear unit 37 in which the first switching mode and the second switching mode are prepared makes it possible to perform the lateral aiming adjustment and the vertical aiming adjustment easily, thereby enhancing the operability and facilitating the aiming adjustments.

On the other hand, when the output shaft 35a of the leveling actuator 35 moves in the front-rearward direction, the lamp unit 8 rotates about the fulcrum portions 28 and 28 of the respective fulcrum bodies 26 and 26 to move in a direction depending on the moving direction of the output shaft 35a, whereby the leveling adjustment is performed.

Figure 9:
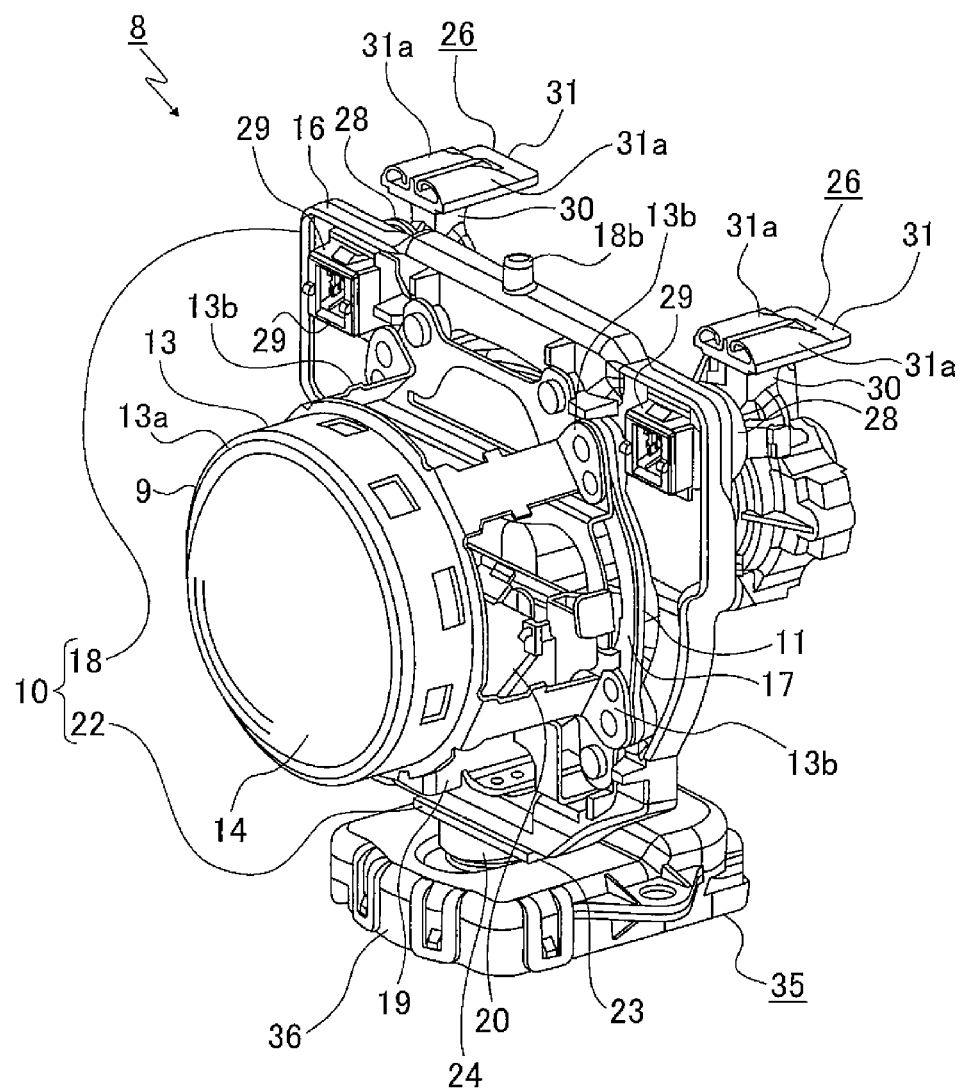
FIG. 9 is a view illustrating an exemplary lamp unit in which a stationary shade and a connecting portion are prepared as separate members.

Though, in the aforementioned embodiment, an example is shown in which the stationary shade 17 and the connecting surface portion 18 are formed integrally with each other, as shown in FIG. 9, instead, the stationary shade 17 and the connecting surface portion 18 may be formed as separate members and the stationary shade 17 may be connected to the connecting surface portion 18 by screwing or the like. Forming the stationary shade 17 and the connecting surface portion 18 as separate members makes it possible, in different types of vehicular headlamps, to use same connecting surface portions 18, while stationary shades of different shapes and sizes are used depending on the types of the vehicular headlamp.

Thus, using the same connecting surface portions 18 in different types of vehicular headlamp enhances common use of components and therefore reduces the production cost. At the same time, it is capable of forming different light distribution patterns depending on the types of the vehicular headlamps by using the stationary shades of different shapes and sizes depending on the types of the vehicular headlamps.

Figure 10:
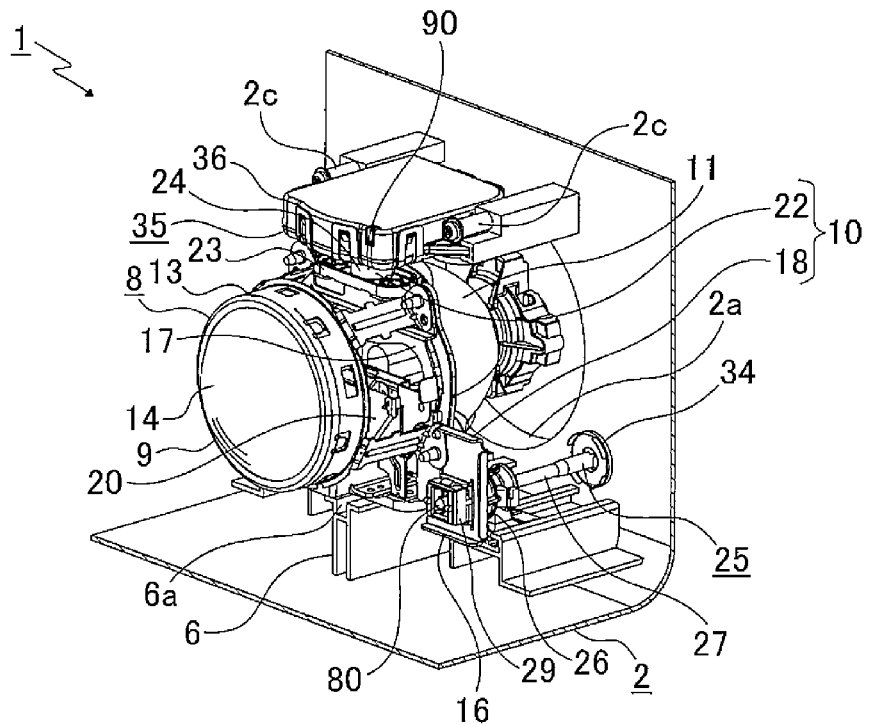
FIG. 10 is a perspective view illustrating an exemplary lamp unit in which a leveling actuator is positioned above an aiming mechanism.
Figure 11:
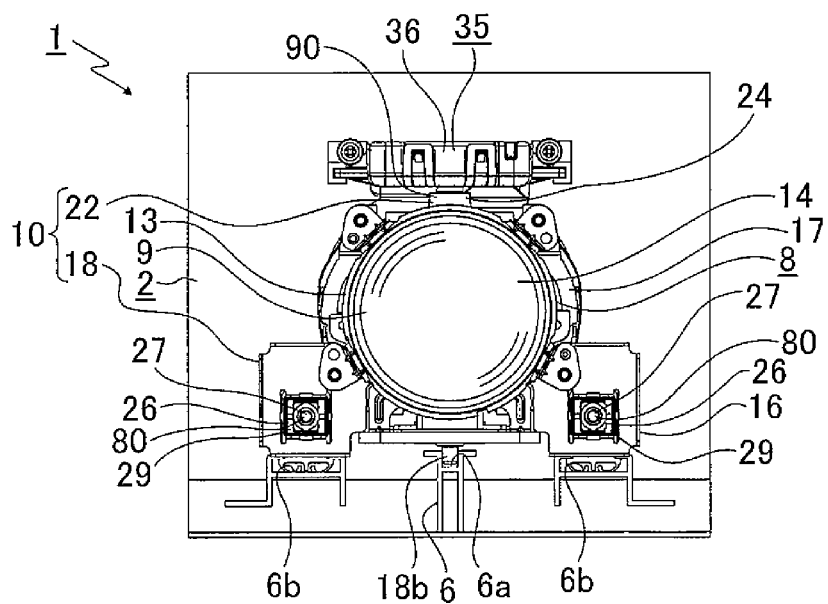
FIG. 11 is a front view illustrating an exemplary lamp unit in which the leveling actuator is positioned above the aiming mechanism.

In addition, though the aforementioned aspect illustrates the example in which the aiming mechanism 25 is arranged at the higher position and the leveling actuator 35 is arranged at the lower position, instead, as illustrated in FIGS. 10 and 11, it may be possible to configure that the aiming mechanism 25 is arranged at the lower position and the leveling actuator 35 is arranged at the higher position. In such a configuration, the support protrusion 6 is arranged at the lower side of the mounting open portion 2a and is inverted in the vertical direction contrary to the support protrusion 6 in the aforementioned vehicular headlamp 1 (See FIG. 1, etc.). The stationary protrusions 2c and 2c are arranged at the upper side of the mounting open portion 2a.

In addition, the connecting holes 18a and 18a is formed in the lower end portion of the connecting surface portion 18 and the regulated portion 18b is provided at the lower end portion of the connecting surface portion 18. The connecting member 22 is attached to the upper surface of the connecting body 16 and the connecting concave portion 24a opens in the upward direction.

The leveling actuator 35 is fixed to the stationary protrusions 2c and 2c in such a manner that the output shaft 35a protrudes downwardly through the insertion hole 36a.

Such a configuration is preferable in a case where, for example, it is difficult to secure a space in which the leveling actuator 35 is located below the lamp unit 8.

Also, in a configuration in which the aiming mechanism 25 is positioned at lower side and the leveling actuator 35 is positioned at upper side, the leveling operation portion 90 is arranged between the pair of the aiming operation portions 80 and 80, on the opposite side of the unit main body 9 from the aiming shafts 27 and 27 (See FIG. 11). In this case, it is preferable that the leveling operation portion 90 is arranged at a position intermediately above the intermediate position between the pair of the aiming operation portions 80 and 80 in the lateral direction, on the opposite side of the unit main body 9 from the aiming shafts 27 and 27. In addition, it is preferable that the regulated portion 18b provided on the connecting surface portion 18 of the connecting body 16 is positioned immediately under the leveling operation portion 90.

Hereinbelow, each modification of the vehicular headlamp will be described.

Figure 12:
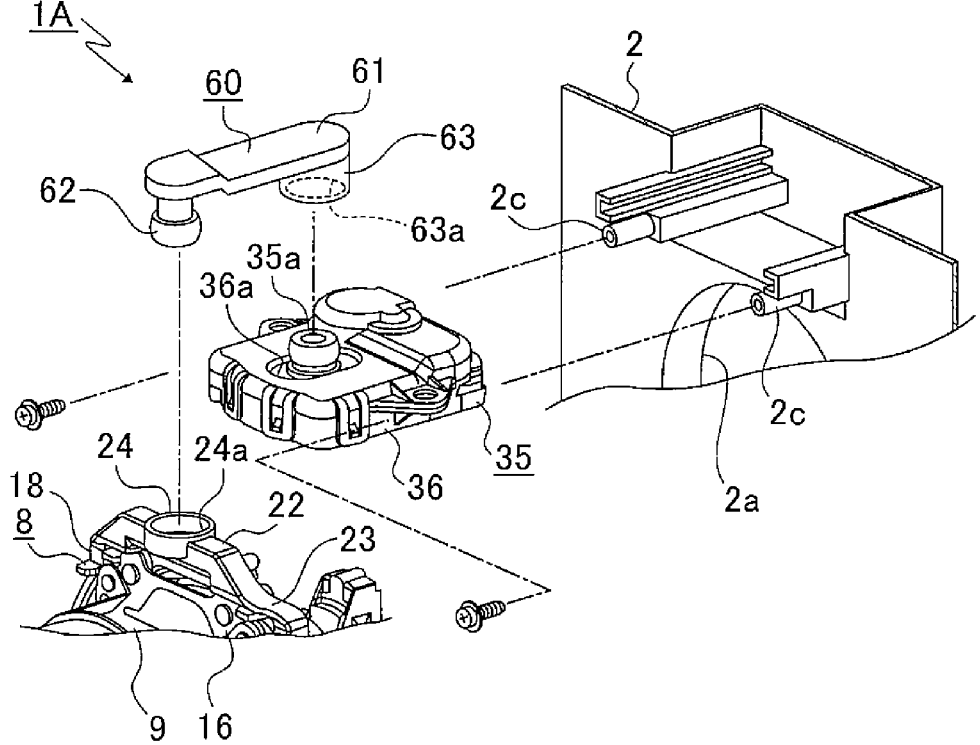
FIG. 12 is a perspective view of a part of a vehicular headlamp according to a first modification.

At first, a first modification will be described (See FIG. 12). It is to be noted that when compared to the vehicular headlamp 1 (See FIGS. 10 and 11) in which the aiming mechanism 25 is arranges at the higher position and the leveling actuator 35 is arranged at the lower position, the vehicular headlamp 1A according to the first modification differs therefrom only in that the leveling actuator is arranged at the rearward portion of the lamp unit with the output shaft protruded in the upward direction and an arm link is used to connect the lamp unit and the leveling actuator. Thus, regarding the vehicular headlamp 1A, only the different portions from the vehicular headlamp 1 as illustrated in FIGS. 10 and 11 are detailed and the other portions, indicated with the same reference signs that are common in the vehicular headlamp 1, are not described. In FIG. 12, only the configuration different from the vehicular headlamp 1 is illustrated schematically.

The leveling actuator 35 is arranged at the rearward portion of the lamp unit 8 and fixed to the stationary protrusions 2c and 2c with the output shaft 35a protruded in the upward direction.

The lamp unit 8 and the leveling actuator 35 are connected with each other by means of an arm link 60. The arm link 60 is made up of an arm portion 61 that extends in a substantially front-rearward direction, a connecting shaft portion 62 that protrudes from a front end portion of the arm portion 61 in the downward direction, and a connecting protrusion portion 63 that protrudes from a rear end portion of the arm portion 61 in the downward direction. The connecting protrusion portion 63 opens in the downward direction and its inner space is formed as a connecting concave portion 63a.

The connecting shaft portion 62 is fitted into the connecting concave portion 24a of the connecting member 22, thereby connecting the arm link 60 to the connecting protrusion 24, and the output shaft 35a is fitted into the connecting concave portion 63a, thereby connecting the arm link 60 to the leveling actuator 35. The lamp unit 8 rotates about the connecting shaft portion 62, thereby allowing the lamp unit 8 to move in both the substantially lateral direction and the substantially vertical direction.

Thus, in the lateral aiming adjustment, the lamp unit 8 rotates about the connecting shaft portion 62 to move in the substantially lateral direction depending on the rotation directions of the respective aiming shafts 27 and 27, while in the vertical aiming adjustment, the lamp unit 8 rotates about the connecting shaft portion 62 to move in the substantially lateral direction depending on the rotation directions of the respective aiming shafts 27 and 27. In addition, the leveling adjustment is performed in such a manner that the lamp unit 8 rotates about the fulcrum portions of the respective fulcrum bodies 26 and 26 to move in a direction depending on the moving direction of the output shaft 35a.

In the aforementioned vehicular headlamp 1A, arranging the leveling actuator 35 at the rearward side of the lamp unit 8 makes it possible to reduce the size of the vehicular headlamp in the vertical direction. In particular, it is possible to reduce the size of the upward protrusion at the front end portion of the vehicular headlamp 1A.

It is to be noted that though in the aforementioned modification, the vehicular headlamp 1A is exemplified such that the aiming mechanism 25 is arranged at the lower side and the leveling actuator 35 is arranged at the upper side, but inversely, the arm link 60 may be used to connect the lamp unit 8 and the leveling actuator 35 in a configuration in which the aiming mechanism 25 is arranged at the upper side and the leveling actuator 35 is arranged at the lower side.

In addition, in the vehicular headlamp 1A, the stationary shade 17 and the connecting surface portion 18 may be formed as separate members.

Figure 13:
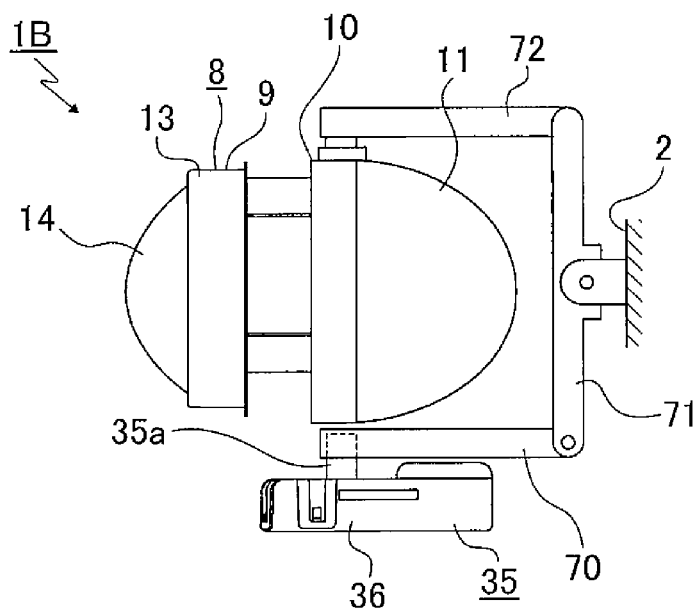
FIG. 13 is a schematic side view of a part of a vehicular headlamp according to a second modification.

Next, a second modification will be described (See FIG. 13). It is to be noted that when compared to the vehicular headlamp 1 (See, for example, FIG. 1), a vehicular headlamp 1B according to the second modification differs therefrom only in that arm links are used for the connection between the lamp unit and the leveling actuator. Thus, regarding the vehicular headlamp 1B, only the different portions are detailed, and the other portions, indicated with the same reference signs that are common in the vehicular headlamp 1, are not described. In FIG. 13, the configuration of the vehicular headlamp 1B is illustrated schematically.

The lamp unit 8 is connected to the leveling actuator 35 by means of arm links 70, 71, and 72. The arm link 70 is connected to the arm link 71 and the arm link 71 is connected to the arm link 72. The arm link 70, which extends in a substantially front-rearward direction, is connected at its front end portion to the output shaft 35a of the leveling actuator 35, the arm link 71, which extends in a substantially vertical direction, is rotatably supported at its center portion by the lamp housing 2, and the arm link 72, which extends in a substantially front-rearward direction, is connected at its front end portion to an upper end portion of the lamp unit 8. The lower end portion of the arm link 71 and a rear end portion of the arm link 70 are rotatably connected to each other. An upper end portion of the arm link 71 is connected to a rear end portion of the arm link 72 and an angle formed between the arm link 71 and the arm link 72 is kept always at an angle of, for example, 90 degrees.

In the vehicular headlamp 1B, when the output shaft 35a of the leveling actuator 35 moves in the front-rearward direction, the arm link 70 and the arm link 71 rotate to move in a direction depending on the moving direction of the output shaft 35a, thereby performing the leveling adjustment of the lamp unit 8.

In the vehicular headlamp 1B, arranging the leveling actuator 35 at the higher position is not required.

In addition, using the plural arm links 70, 71, and 72 for the connection of the lamp unit 8 and the leveling actuator 35 will make it possible to position the leveling actuator 35 wherever desired, thereby enhancing the possibility of design.

It is to be noted that in the vehicular headlamp 1B, the lamp unit 8 and the leveling actuator 35 may be connected by means of the arm links 70, 71, and 72 with the aiming mechanism 25 positioned at the lower side and and the leveling actuator 35 positioned at the upper side. In addition, the stationary shade 17 and the connecting surface portion 18 may be formed as separate members.

As described above, in the vehicular headlamp 1, 1A, and 1B, the leveling operation portion 90 is arranged between the pair of the aiming operation portions 80 and 80, on the on the opposite side of the unit main body 9 from the aiming shafts 27 and 27.

Thus, it is possible to make both positions of the aiming operation portions 80 and 80 and the position of the leveling operation portion 90 relative to the lamp unit 8 in good balance, which allows ensuring sufficient strength against vibrations. In addition, since the output shaft 35a of the leveling actuator 35 is not lopsided in the lateral direction, it is possible to efficiently utilize a space of a lamp chamber 5, thereby reducing the size of the vehicular headlamp.

In particular, when the leveling operation portion 90 is arranged at a position corresponding to the intermediate position between the pair of the aiming operation portions 80 and 80 in the lateral direction, on the opposite side of the unit main body 9 from the aiming shafts 27 and 27, the positions of the aiming operation portions 80 and 80 and the leveling operation portion 90 with respect to the lamp unit 8 correspond to respective vertexes of an isosceles triangle. As a result, it is possible to secure strength against vibrations and reduce the size of the vehicular headlamp.

In addition, the leveling actuator 35 is fixed to the lamp housing 2, thereby improving the strength against vibrations.

As described above, a vehicular headlamp according to the present invention includes: a lamp unit that includes a unit main body including a light source and a connecting portion arranged at least partially at an outer circumferential side of the unit main body; a leveling actuator that is connected to the connecting portion and that moves the lamp unit to adjust an irradiation direction of light emitted from the light source; and an aiming mechanism that includes a pair of aiming shafts connected to the connecting portion and that moves, through an operation of the aiming shafts, the lamp unit to adjust an irradiation direction of light emitted from the light source. The connecting portion has a leveling operation portion to which the leveling actuator is connected and a pair of aiming operation portions to which the respective the aiming shafts are connected. The pair of the aiming operation portions are arranged spaced from each other in a lateral direction of the vehicular headlamp. The leveling operation portion is arranged between the pair of the aiming operation portions, on an opposite side of the unit main body from the pair of the aiming shafts.

Thereby, it is possible to make the positions of the aiming operation portions and the position of the leveling operation portion relative to the lamp unit in good balance.

The leveling operation portion may be arranged at a position corresponding to an intermediate position between the pair of the aiming operation portions, on the opposite side of the unit main body from the pair of the aiming shafts.

Thereby, the position of the aiming operation portions and the position of the leveling operation portion with respect to the lamp unit are arranged at positions corresponding to respective vertexes of an isosceles triangle.

The vehicular headlamp may further includes a lamp housing that constitutes a lamp outer case. In this case, a regulated portion may be provided in the lamp unit and supported by the lamp housing so as to be movable in a front-rearward direction of the vehicular headlamp and so as to be immovable in the lateral direction of the vehicular headlamp.

Thereby, the displacement of the lamp unit in the lateral direction is restricted.

The leveling actuator may be fixed to the lamp housing.

Thereby, the backlash of the leveling actuator relative to the lamp housing is restricted.

The vehicular headlamp may further include an arm link that extends in a predetermined direction. In this case, the leveling actuator may be connected, through the arm link, to the connecting portion. Further, the leveling actuator may be arranged at a rear side of the lamp unit.

Thereby, it is possible to avoid locating the leveling actuator above the lamp unit.

When a plurality of arm links are provided, the plurality of the arm links may be connected to one another such that each arm link is allowed to rotate about an axis extending in the lateral direction of the vehicular headlamp, and one of the arm links may be supported by the lamp housing such that the one of the arm links is allowed to rotate about an axis extending in the lateral direction of the vehicular headlamp.

Thereby, the lamp unit and the leveling actuator are connected by the plurality of the arm links.

The vehicular headlamp may further include a gear unit that includes a plurality of gears and a gear switching mechanism that changes an engagement state of the plurality of gears. In this case, a rotational force from the plurality of gears may be transmitted to the pair of the aiming shafts, the gear switching mechanism may switch between a first switching mode and a second switching mode, the pair of the aiming shafts may rotate in the same direction in the first switching mode, and the pair of the aiming shafts may rotate in the opposite directions in the second switching mode. Further, the gear switching mechanism may switch between the first switching mode and the second switching mode depending on an operation on the gear unit using a jig.

Thereby, the lamp unit moves in different direction in the respective first and second switching modes.

What is claimed is:

1. A vehicular headlamp comprising:
    a lamp unit that includes a unit main body including a light source and a connecting portion arranged at least partially at an outer circumferential side of the unit main body;
    a leveling actuator that is connected to the connecting portion and that moves the lamp unit to adjust an irradiation direction of light emitted from the light source; and
    an aiming mechanism that includes a pair of aiming shafts connected to the connecting portion and that moves, through an operation of the aiming shafts, the lamp unit to adjust an irradiation direction of light emitted from the light source, wherein:
    the connecting portion has a leveling operation portion to which the leveling actuator is connected and a pair of aiming operation portions to which the respective the aiming shafts are connected;
    the pair of the aiming operation portions are arranged spaced from each other in a lateral direction of the vehicular headlamp; and
    the leveling operation portion is arranged between the pair of the aiming operation portions, on an opposite side of the unit main body from the pair of the aiming shafts.

2. The vehicular headlamp according to claim 1, wherein the leveling operation portion is arranged at a position corresponding to an intermediate position between the pair of the aiming operation portions, on the opposite side of the unit main body from the pair of the aiming shafts.

3. The vehicular headlamp according to claim 1, further comprising a lamp housing that constitutes a lamp outer case, wherein
    a regulated portion is provided in the lamp unit and supported by the lamp housing so as to be movable in a front-rearward direction of the vehicular headlamp and so as to be immovable in the lateral direction of the vehicular headlamp.

4. The vehicular headlamp according to claim 1, further comprising a lamp housing that constitutes a lamp outer case, wherein
    the leveling actuator is fixed to the lamp housing.

5. The vehicular headlamp according to claim 1, further comprising an arm link that extends in a predetermined direction, wherein
    the leveling actuator is connected, through the arm link, to the connecting portion.

6. The vehicular headlamp according to claim 5, wherein the leveling actuator is arranged at a rear side of the lamp unit.

7. The vehicular headlamp according to claim 5, further comprising a lamp housing that constitutes a lamp outer case, wherein:
    a plurality of arm links are provided;
    the plurality of the arm links are connected to one another such that each arm link is allowed to rotate about an axis extending in the lateral direction of the vehicular headlamp; and
    one of the arm links is supported by the lamp housing such that the one of the arm links is allowed to rotate about an axis extending in the lateral direction of the vehicular headlamp.

8. The vehicular headlamp according to claim 1, further comprising a gear unit that includes a plurality of gears and a gear switching mechanism that changes an engagement state of the plurality of gears, wherein:
    a rotational force from the plurality of gears are transmitted to the pair of the aiming shafts;

the gear switching mechanism switches between a first switching mode and a second switching mode;

the pair of the aiming shafts rotate in the same direction in the first switching mode and the pair of the aiming shafts rotate in the opposite directions in the second switching mode.

9. The vehicular headlamp according to claim 8, wherein the gear switching mechanism switches between the first switching mode and the second switching mode depending on an operation on the gear unit using a jig.

* * * * *